(12) United States Patent
Song et al.

(10) Patent No.: US 11,277,879 B2
(45) Date of Patent: Mar. 15, 2022

(54) CONTROLLING METHOD FOR COEXISTENCE OF DUAL MODES, WI-FI CHIP, AND COMMUNICATION DEVICE

(71) Applicant: SENGLED CO., LTD., Shanghai (CN)

(72) Inventors: Weiwei Song, Shanghai (CN); Jinxiang Shen, Shanghai (CN)

(73) Assignee: SENGLED CO., LTD., Shanghai (CN)

( * ) Notice: Subject to any disclaimer, the term of this patent is extended or adjusted under 35 U.S.C. 154(b) by 408 days.

(21) Appl. No.: 16/338,857

(22) PCT Filed: Nov. 28, 2017

(86) PCT No.: PCT/CN2017/113365
§ 371 (c)(1),
(2) Date: Apr. 2, 2019

(87) PCT Pub. No.: WO2018/121160
PCT Pub. Date: Jul. 5, 2018

(65) Prior Publication Data
US 2021/0289578 A1    Sep. 16, 2021

(30) Foreign Application Priority Data

Dec. 29, 2016  (CN) .......................... 201611248096.9

(51) Int. Cl.
*H04W 76/25* (2018.01)
*H04W 84/12* (2009.01)

(52) U.S. Cl.
CPC ............ *H04W 76/25* (2018.02); *H04W 84/12* (2013.01)

(58) Field of Classification Search
CPC combination set(s) only.
See application file for complete search history.

(56) References Cited

U.S. PATENT DOCUMENTS

| 2014/0071870 A1* | 3/2014 | Abraham | .......... H04W 52/0206 370/311 |
| 2015/0245400 A1* | 8/2015 | Aoki | ..................... H04W 76/12 370/329 |
| 2017/0064595 A1* | 3/2017 | Chang | ................... H04W 48/16 |

FOREIGN PATENT DOCUMENTS

| CN | 104185224 A | 12/2014 |
| CN | 105792389 A | 7/2016 |

(Continued)

OTHER PUBLICATIONS

The World Intellectual Property Organization (WIPO) International Search Report and Written Opinion for PCT/CN2017/113365 dated Feb. 14, 2018 7 Pages.

*Primary Examiner* — Mansour Oveissi
(74) *Attorney, Agent, or Firm* — Anova Law Group, PLLC (57) ABSTRACT

A controlling method for coexistence of dual modes, including: when a Wi-Fi chip in a station (STA) mode needs to switch from a first signal channel to a second signal channel, sending, by the Wi-Fi chip in an access point (AP) mode, a control message to an external device, where the control message indicates that the Wi-Fi chip is in an absent status within a preset period of time, thus enabling the external device to stop transmitting data to the Wi-Fi chip based on the control message within the preset period of time; within the preset period of time, switching the Wi-Fi chip to work in the second signal channel; and when the preset period of time ends, switching the Wi-Fi chip back to work in the first signal channel.

12 Claims, 3 Drawing Sheets

(56) References Cited

FOREIGN PATENT DOCUMENTS

| CN | 106604413 A | 4/2017 |
|---|---|---|
| WO | 2013133911 A1 | 9/2013 |

* cited by examiner

When a Wi-Fi chip in the STA mode needs to switch from a first signal channel to a second signal channel, sending, by the Wi-Fi chip in the AP mode, a control message to an external device, wherein the control message is configured to notify that the Wi-Fi chip is in an absent status within a preset period of time, thus enabling the external device to stop transmitting data to the Wi-Fi chip based on the control message within the preset period of time — S101

Within the preset period of time, switching the Wi-Fi chip in both the STA mode and the AP mode to work in the second signal channel — S102

When the preset period of time comes to an end, switching the Wi-Fi chip in the STA mode and the AP mode back to work in the first signal channel — S103

CONTROLLING METHOD FOR COEXISTENCE OF DUAL MODES, WI-FI CHIP, AND COMMUNICATION DEVICE

CROSS-REFERENCES TO RELATED APPLICATIONS

This application is a national phase entry under 35 U.S.C. § 371 of PCT Patent Application No. PCT/CN2017/113365, filed on Nov. 28, 2017, which claims the priority to Chinese Patent Application No. 201611248096.9 filed on Dec. 29, 2016, the entire content of which is incorporated herein by reference.

FIELD OF THE DISCLOSURE

The present disclosure generally relates to the field of Wi-Fi technology, and more particularly, relates to a controlling method for coexistence of dual modes, a Wi-Fi chip, and a communication device.

BACKGROUND

Existing wireless fidelity (Wi-Fi) chips often have two working modes: one is a station mode (hereinafter referred to as "STA mode"), and the other is an access point mode (hereinafter referred to as "AP mode"). The Wi-Fi chip may operate in one working mode, or operate in both working modes. Further, when the Wi-Fi chip works simultaneously in the STA mode and the AP mode, the Wi-Fi chip can only use one signal channel at a specific moment. That is, if the signal channel of the Wi-Fi chip in the STA mode changes, the signal channel of the Wi-Fi chip in the AP mode changes correspondingly.

To ensure each terminal to which the Wi-Fi chip is connected maintains a connected status in the AP mode, the Wi-Fi chip sends a control packet to each terminal, and the control packet is configured to arrange signal channel switching time with the corresponding terminal. When the arranged time arrives, the signal channel that connects the Wi-Fi chip with each terminal may be switched. But, because the processing capabilities of the Wi-Fi chip and each terminal are different from each other, certain devices may fail to timely switch the signal channel at the arranged time, which results in loss of connection.

BRIEF SUMMARY OF THE DISCLOSURE

The present disclosure provides a controlling method for coexistence of dual modes, a Wi-Fi chip, and a communication device, thereby ensuring that the connection between the Wi-Fi chip and external device(s) is not cut off when the Wi-Fi chip switches the signal channel.

In a first aspect, the present disclosure provides a controlling method for coexistence of dual modes, and the dual modes include a STA mode and an AP mode. The method specifically includes: when the Wi-Fi chip in the STA mode needs to switch from a first signal channel to a second signal channel, the Wi-Fi chip in the AP mode sends a control message to an external device, where the control message is configured to indicate that the Wi-Fi chip is in an absent status within a preset period of time, thus enabling the external device to stop transmitting data to the Wi-Fi chip within the preset period of time based on the control message; within the preset period of time, switching the Wi-Fi chip in both the STA mode and the AP mode to work in the second signal channel; and when the preset period of time ends, switching the Wi-Fi chip in the STA mode and the AP mode back to work in the first signal channel.

In a second aspect, the present disclosure provides a Wi-Fi chip, and the Wi-Fi chip works simultaneously in the STA mode and the AP mode. The Wi-Fi chip includes: a sending module and a switching module. The sending module is connected to the switching module.

The sending module is configured to, when the Wi-Fi chip in the STA mode needs to be switched from a first signal channel to a second signal channel, send a control message to an external device in the AP mode. The control message is configured to indicate that the Wi-Fi chip is in an absent status within a preset period of time, thus enabling the external device to stop transmitting data to the Wi-Fi chip based on the control message within the preset period of time.

The switching module is configured for switching the Wi-Fi chip in both the STA mode and the AP mode to work in the second signal channel within the preset period of time. Further, the switching module is configured for, when the preset period of time ends, switching the Wi-Fi chip in the STA mode and the AP mode back to work in the first signal channel.

In a third aspect, the present disclosure provides a communication device, comprising a Wi-Fi chip provided by the second aspect of the present disclosure.

The present disclosure provides a controlling method for coexistence of dual modes, a Wi-Fi chip, and a communication device. The Wi-Fi chip may notify an external device that the Wi-Fi chip is in an absent status via a control message, such that the external device does not need to transmit data to the Wi-Fi chip temporarily. Accordingly, even if the Wi-Fi chip in the STA mode and the AP mode changes the signal channel, the external device connected to the Wi-Fi chip in the AP mode does not need to switch the signal channel. Because the external device does not transmit data to the Wi-Fi chip, the issue that data transmission fails may no longer exist, thus avoiding the occurrence of the phenomenon of disconnection.

BRIEF DESCRIPTION OF THE DRAWINGS

To more clearly illustrate the technical solutions in embodiments of the present disclosure or the prior art, the accompanying drawings of the present disclosure or the prior art are briefly introduced hereinafter. Obviously, the accompanying drawings merely provide certain exemplary implementations, based on which, other drawings or implementations may be obtainable by those ordinarily skilled in the art without creative effort.

DETAILED DESCRIPTION

To make the objectives, technical solutions, and advantages of the present disclosure clearer, with reference to the accompanying drawings of the present disclosure, technical solutions of the present disclosure are described more fully hereinafter. Obviously, the disclosed embodiments only provide some exemplary implementations. Based on the disclosed embodiments, other embodiments obtainable by those ordinarily skilled in the relevant art without creative labor shall all fall within the protection scope of the present disclosure.

Figure 1:
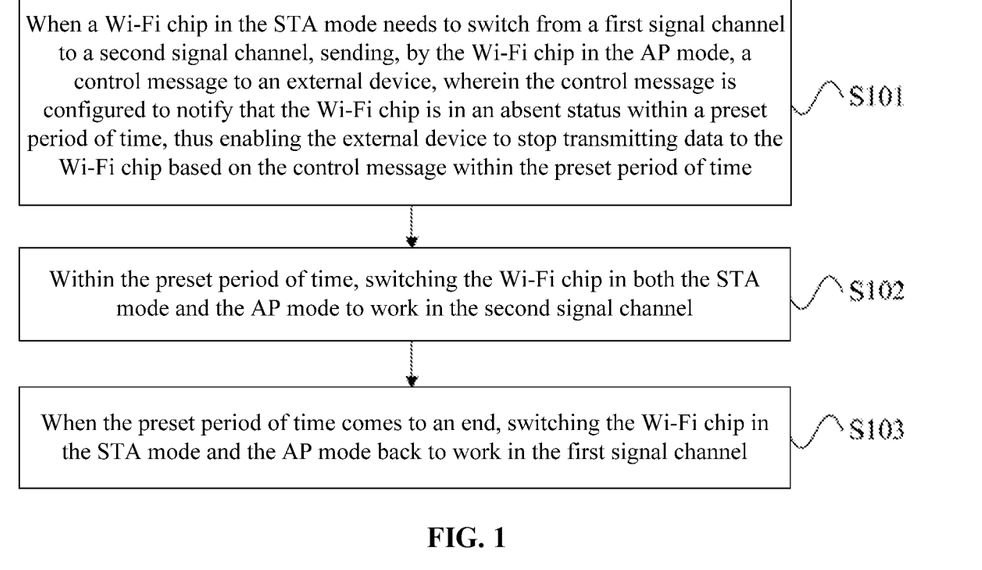
FIG. 1 illustrates a flow chart of a controlling method for coexistence of dual modes consistent with embodiments of the present disclosure.

FIG. 1 illustrates a flow chart of a controlling method for coexistence of dual modes consistent with embodiments of the present disclosure. As shown in FIG. 1, the method may include: when a Wi-Fi chip in the STA mode needs to switch from a first signal channel to a second signal channel, sending, by the Wi-Fi chip in the AP mode, a control message to an external device (S101). The control message is configured to indicate that the Wi-Fi chip is in an absent status within a preset period of time, thus enabling the external device to stop transmitting data to the Wi-Fi chip based on the control message within the preset period of time.

The method may further include: within the preset period of time, switching the Wi-Fi chip in both the STA mode and the AP mode to work in the second signal channel (S102); and when the preset period of time ends, switching the Wi-Fi chip in the STA mode and the AP mode back to work in the first signal channel (S103).

In one embodiment, the Wi-Fi chip may work simultaneously in the STA mode and the AP mode. When the Wi-Fi chip working in the STA mode needs to switch the signal channel, for example, when the Wi-Fi chip in the STA mode needs to switch from the first signal channel to the second signal channel, the Wi-Fi chip in the AP mode needs to send a control message to an external device. The external device may be in a same Wi-Fi network as the Wi-Fi chip, and the Wi-Fi chip may function as an access point of the Wi-Fi network. That is, the Wi-Fi chip may send control messages to all external devices in the same Wi-Fi network as the Wi-Fi chip.

The control message is configured to indicate that the Wi-Fi chip is in an absent status or a sleeping status within a preset period of time. The external device that receives the control message may thus determine that the Wi-Fi chip is in the absent status based on the control message and temporarily stop transmitting data to the Wi-Fi chip, thereby ensuring the connected status between the Wi-Fi chip and the external device.

After the Wi-Fi chip sends the control message, within the preset period of time, the Wi-Fi chip in the STA mode and the AP mode may switch to work in the second signal channel from the first signal channel and may, for example, perform a test of wireless connection. After the preset period of time ends, the Wi-Fi chip in the STA mode and the AP mode may switch back to work in the first signal channel from the second signal channel. Further, the external device may restore data transmission to the Wi-Fi chip, and the external device and the Wi-Fi chip both work in the first signal channel. Thus, the data transmission is restored.

The present disclosure provides a controlling method for coexistence of dual modes. The Wi-Fi chip may notify an external device that the Wi-Fi chip is in an absent status via a control message, such that the external device does not need to transmit data to the Wi-Fi chip temporarily. Accordingly, even if the Wi-Fi chip in the STA mode and the AP mode changes the signal channel, the external device connected to the Wi-Fi chip in the AP mode does not need to switch the signal channel. Because the external device does not transmit data to the Wi-Fi chip temporarily, the connected status is maintained, thus avoiding the occurrence of the phenomenon of disconnection.

Optionally, the control message may include a notice of absence (hereinafter referred to as "NoA") protocol field, and the NoA protocol field may be configured for notifying that the Wi-Fi chip is in the absent status within the preset period of time.

Optionally, the NoA protocol field may include: a start time field (hereinafter referred to as "Start Time field"), an absent duration field (hereinafter referred to as "Duration field"), a field of an interval between two consecutive absent durations (hereinafter referred to as "Interval field"), and a field of a count of absent durations (hereinafter referred to as "Count field"). The Start Time field is configured to indicate the time that the Wi-Fi chip starts to be in the absent status, and the Duration field is configured to indicate the duration that the Wi-Fi chip stays in the absent status. Further, the Interval field is configured to indicate the interval between two consecutive absent durations. The Count field is configured to indicate the total number of the absent durations within an absent period.

For example, the Start Time may be 152138022, the Count may be 1, the Duration may be 79579 µs, and in such operation, the data transmission duration (hereinafter referred to as "Interval-Duration") may be 0 µs. That is, the external device stays to be connected and the data transmission does not need to be restored, when the Start Time (i.e., 152138022) arrives, the external device stops data transmission to the Wi-Fi chip, which lasts for 79579 µs. Further, at the time of (152138022+79579) µs, the external device restores the data transmission. At the Start Time of 152138022, the Wi-Fi chip switched to work in the second signal channel, and the Wi-Fi chip works in the second signal channel for 79579 µs. At the moment of (152138022+79579) µs, the Wi-Fi chip switches back to work in the first signal channel.

In one embodiment, the NoA protocol field in the control message may be illustrated using an example as follows; however, the present disclosure is not limited thereto.

Notice of Absence (NoA field)
Duration: 79579 (Duration field)
Start Time: 152138022 (Start Time field)
Interval: 79579 (Interval field)
Count: 1 (Count field)

Optionally, the control message may be a beacon frame, or the control message may be a probe response frame. Or, the control message may include a beacon frame and a probe response frame. Optionally, before the Wi-Fi chip executes S101, the Wi-Fi chip may add the NoA protocol field to the control message.

In one embodiment, the control message may be a beacon frame, and before the Wi-Fi chip executes S101, the Wi-Fi chip may add the NoA protocol field to the beacon frame. Further, the Wi-Fi chip in the AP mode may send the beacon frame with the added NoA protocol field to an external device.

In another embodiment, the control message may be a probe response frame. Before the Wi-Fi chip executes S101, the Wi-Fi chip may add the NoA protocol field to the probe response frame. Further, the Wi-Fi chip in the AP mode may send the probe response frame with the added NoA protocol field to an external device.

In another embodiment, the control message may be a beacon frame and a probe response frame. Before the Wi-Fi chip executes S101, the Wi-Fi chip may add the NoA protocol field to the beacon frame and add the NoA protocol field to the probe response frame. Further, the Wi-Fi chip in the AP mode may send the beacon frame with the added NoA protocol field and the probe response frame with the added NoA protocol field to an external device.

Optionally, after the Wi-Fi chip in the STA mode and the AP mode switches back to work in the first signal channel, the Wi-Fi chip may stop adding the NoA protocol field to the control message. That is, after the Wi-Fi chip in the STA mode and the AP mode switches back to work in the first signal channel, if the Wi-Fi chip sends the beacon frame and/or the probe response frame to the external device, the beacon frame and/or the probe response frame sent by the Wi-Fi chip may include no NoA protocol field.

Figure 2:
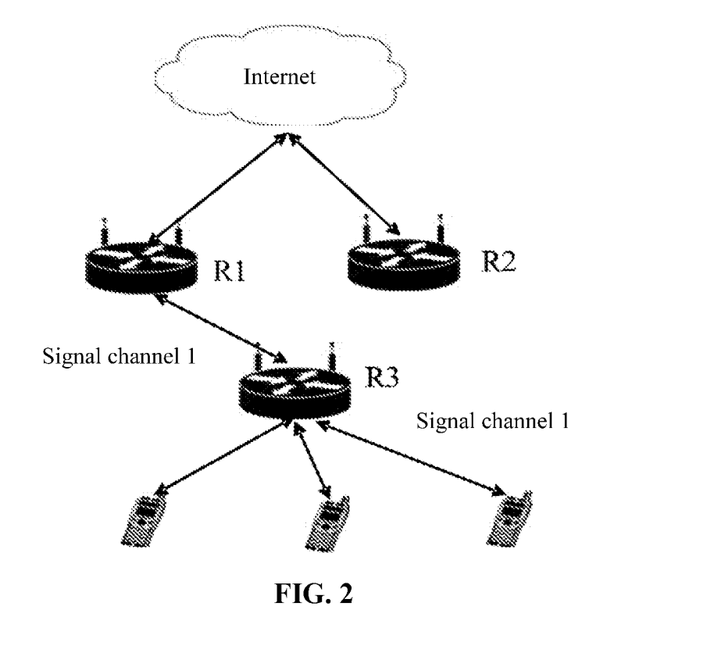
FIG. 2 is a schematic view illustrating an exemplary application scenario consistent with embodiments of the present disclosure.
Figure 3:
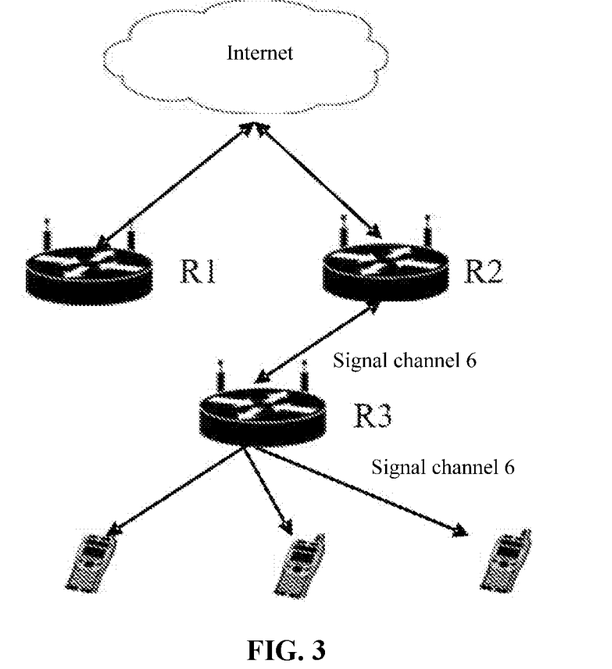
FIG. 3 is a schematic view illustrating another exemplary application scenario consistent with embodiments of the present disclosure.

FIG. 2 is a schematic view illustrating an exemplary application scenario consistent with embodiments of the present disclosure. FIG. 3 is a schematic view illustrating another exemplary application scenario consistent with embodiments of the present disclosure. As shown in FIG. 2, a router R3 may include a Wi-Fi chip supporting the coexistence of the STA mode and the AP mode. The router R3 is connected to a router R1 through a signal channel 1 in the STA mode, and the router R3 is connected to a plurality of clients through the signal channel 1 in the AP mode. The plurality of clients may, for example, include three cellphones, and the three cellphones may visit internet via the router R3.

After working in the STA mode for a certain period of time, the router R3 may switch to a signal channel 6 for connection to a router R2, as shown in FIG. 3. The router R3 may be connected to the router R2 to carry out certain tasks, such as performing a wireless connection test. Further, the router R3 in the AP mode may add the NoA protocol field to the beacon frame and the probe response frame broadcasted in the AP mode and, optionally, the router R3 may further include the needed period of time in the beacon frame and the probe response frame. Further, the router R3 in the STA mode switches to the signal channel 6 and the router R3 in the AP mode also switches to the signal channel 6, as shown in FIG. 3.

Further, after the needed period of time ends, the router R3 in the STA mode switches back to the signal channel 1, and the router R3 in the AP mode switches back to the signal channel 1. The NoA protocol field is no longer added to the broadcasted beacon frame and the probe response frame, and sending of the normal beacon frame and probe response is recovered.

Figure 4:
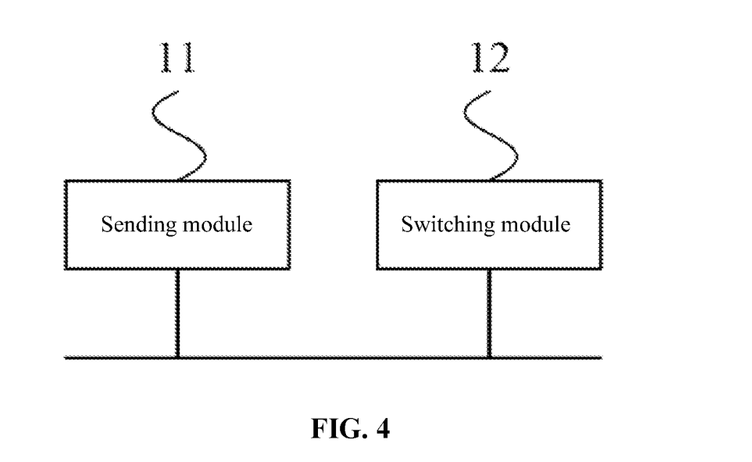
FIG. 4 is a structural schematic view of an exemplary Wi-Fi chip consistent with embodiments of the present disclosure.

FIG. 4 is a structural schematic view of an exemplary Wi-Fi chip consistent with embodiments of the present disclosure. As shown in FIG. 4, the Wi-Fi chip may include a sending module 11 and a switching module 12, and the Wi-Fi chip may simultaneously work in the STA mode and the AP mode. The sending module 11 may be connected to the switching module 12, for example, through a communication bus.

The sending module 11 may be configured to send a control message to an external device in the AP mode when the Wi-Fi chip in the STA mode needs to switch from a first signal channel to a second signal channel. The control message is configured to indicate that the Wi-Fi chip is in an absent status within a preset period of time, thus enabling the external device to stop transmitting data to the Wi-Fi chip based on the control message within the preset period of time.

The switching module 12 is configured to, within the preset period of time, switch the Wi-Fi chip in both the STA mode and the AP mode to work in the second signal channel. When the preset period of time ends, the switching module 12 may be further configured to switch the Wi-Fi chip in the STA mode and the AP mode back to work in the first signal channel.

In one embodiment, the Wi-Fi chip may work simultaneously in the STA mode and the AP mode. When the Wi-Fi chip working in the STA mode needs to switch the channel, for example, when the Wi-Fi chip in the STA mode needs to switch from the first signal channel to the second signal channel, the sending module 11 of the Wi-Fi chip in the AP mode needs to send a control message to the external device. The external device may be in a same Wi-Fi network as the Wi-Fi chip, and the Wi-Fi chip may function as an access point of the Wi-Fi network. That is, the sending module 11 of the Wi-Fi chip may send control messages to all external devices in the same Wi-Fi network as the Wi-Fi chip.

The control message is configured to indicate that the Wi-Fi chip is in an absent status or a sleeping status within a preset period of time. The external device that receives the control message may thus determine that the Wi-Fi chip is in the absent status based on the control message and temporarily stop transmitting data to the Wi-Fi chip, thereby ensuring the connected status between the Wi-Fi chip and the external device.

After the sending module 11 of the Wi-Fi chip sends the control message, the switching module 12 of the Wi-Fi chip may switch to work in the second signal channel from the first signal channel in the STA mode and the AP mode within the preset period of time. For example, the Wi-Fi chip may perform a test of wireless connection. After the preset period of time ends, the switching module 12 of the Wi-Fi chip may switch back to the work in the first signal channel from the second signal channel in the STA mode and the AP mode. Further, the external device may restore data transmission to the Wi-Fi chip, and the external device and the Wi-Fi chip both work in the first signal channel. Thus, the data transmission is restored.

By using the disclosed Wi-Fi chip, the sending module 11 of the Wi-Fi chip may notify an external device that the Wi-Fi chip is in an absent status via a control message, such that the external device temporarily stops transmitting data to the Wi-Fi chip. Accordingly, even if the Wi-Fi chip in the STA mode and the AP mode changes the signal channel, the external device connected to the Wi-Fi chip in the AP mode does not need to switch the signal channel. Because the external device does not transmit data to the Wi-Fi chip, the issue that data transmission fails may not occur, thus avoiding the occurrence of the phenomenon of disconnection.

Optionally, the control message may include a NoA protocol field, and the NoA protocol field may be configured for notifying that the Wi-Fi chip is in the absent status within the preset period of time.

Optionally, the NoA protocol field may include: a start time field (hereinafter referred to as "Start Time field"), an absent duration field (hereinafter referred to as "Duration field"), a field of an interval between two consecutive absent durations (hereinafter referred to as "Interval field"), and a field of a count of absent durations (hereinafter referred to as "Count field"). The Start Time field is configured to indicate the time that the Wi-Fi chip starts to be in the absent status, and the Duration field is configured to indicate the duration that the Wi-Fi chip stays in the absent status. Further, the Interval field is configured to indicate the interval between two consecutive absent durations. The Count field is configured to indicate the total number of the absent durations included in an absent period.

For example, the Start Time may be 152138022, the Count may be 1, and the Duration may be 79579 µs. In such an operation, the data transmission duration (hereinafter referred to as "Interval-Duration") may be 0 µs. That is, the external device stays connected, and the data transmission is not performed. The external device stops data transmission to the Wi-Fi chip when the Start Time arrives, which lasts for 79579 µs. Further, at the moment of (152138022+79579) µs, the external device restores the data transmission to the Wi-Fi chip. At the Start Time of 152138022, the Wi-Fi chip switched to work in the second signal channel, and the Wi-Fi chip works in the second signal channel for 79579 µs. At the moment of (152138022+79579) µs, the Wi-Fi chip switches to work in the first signal channel.

In one embodiment, the NoA protocol field in the control message may be illustrated using an example as follows; however, the present disclosure is not limited thereto.

Notice of Absence (NoA field)
Duration: 79579 (Duration field)
Start Time: 152138022 (Start Time field)
Interval: 79579 (Interval field)
Count: 1 (Count field)

Figure 5:
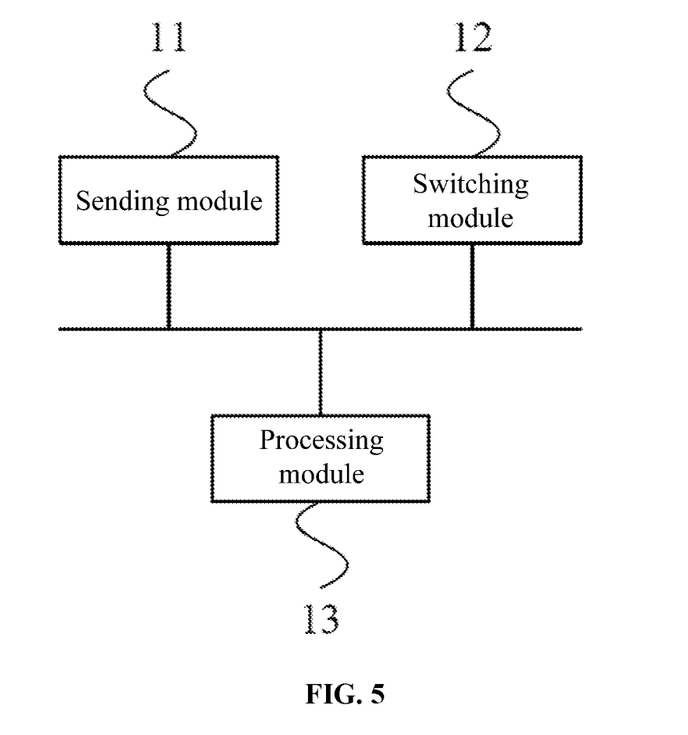
FIG. 5 is a structural schematic view of another exemplary Wi-Fi chip consistent with embodiments of the present disclosure.

FIG. 5 is a structural schematic view of another exemplary Wi-Fi chip consistent with embodiments of the present disclosure. Referring to FIG. 5, based on the structure of the Wi-Fi chip illustrated in FIG. 4, the Wi-Fi chip may include a sending module 11, a switching module 12, and a processing module 13. Functions of the sending module 11 and the switching module 12 in FIG. 5 are similar to that in FIG. 4, and repeated descriptions are not provided herein. The processing module 13 may be connected to the sending module 11, for example, via a communication bus. Optionally, the processing module 13 may also be connected to the switching module 12 via the communication bus.

Further, the control message sent by the sending module 11 may be a beacon frame. Or, the control message may be a probe response frame. Or, the control message may be a beacon frame and a probe response frame. The processing module 13 may be configured to add the NoA protocol field to the control message before the sending module 11 sends the control message to the external device in the AP mode.

In one embodiment, the control message may be a beacon frame. The processing module 13 of the Wi-Fi chip may add the NoA protocol field to the beacon frame. Further, the sending module 11 of the Wi-Fi chip in the AP mode may send the beacon frame with the added NoA protocol field to an external device.

In another embodiment, the control message may be a probe response frame. The processing module 13 of the Wi-Fi chip may add the NoA protocol field to the probe response frame. Further, the sending module 11 of the Wi-Fi chip in the AP mode may send the probe response frame with the added NoA protocol field to an external device.

In another embodiment, the control message may be a beacon frame and a probe response frame. The processing module 13 of the Wi-Fi chip may add the NoA protocol field to the beacon frame and add the NoA protocol field to the probe response frame. Further, the sending module 11 of the Wi-Fi chip in the AP mode may send the beacon frame with the added NoA protocol field and the probe response frame with the added NoA protocol field to an external device.

Optionally, by being connected to the switching module 12, the processing module 13 may be further configured to stop adding the NoA protocol field to the control message after the switching module 12 of the Wi-Fi chip in the STA mode and the AP mode switches to work in the first signal channel. That is, after the switching module 12 of the Wi-Fi chip switches to work in the first signal channel in the STA mode and the AP mode, if the sending module 11 of the Wi-Fi chip sends the beacon frame and/or the probe response frame to the external device, the processing module 13 may stop adding the NoA protocol field to the beacon frame and/or the probe response frame, and the beacon frame and/or the probe response frame sent by the Wi-Fi chip may include no NoA protocol field.

Figure 6:
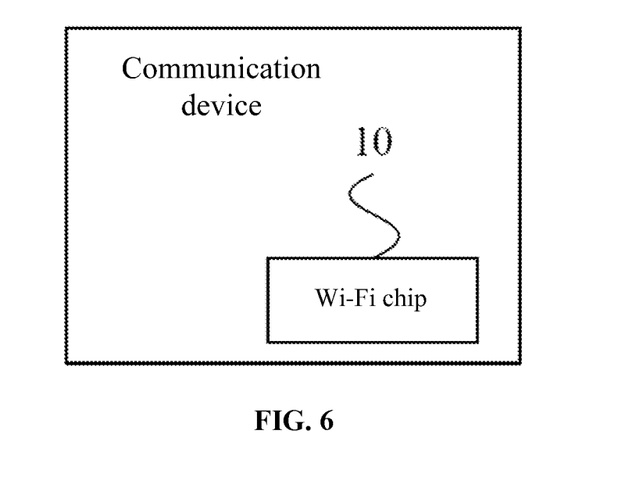
FIG. 6 is a structural schematic view of a communication device consistent with embodiments of the present disclosure.

FIG. 6 is a structural schematic view of a communication device consistent with embodiments of the present disclosure. As shown in FIG. 6, the communication device may include a Wi-Fi chip 10, and the Wi-Fi chip 10 may have a structure illustrated in FIG. 4 or FIG. 5. Correspondingly, the technical solutions of the aforementioned method embodiments may be executed. The implementation principles and technical effects are similar to the foregoing descriptions, and are not repeated herein.

Those ordinarily skilled in the relevant art shall understand that all or partial steps of the aforementioned method embodiments may be implemented by hardware related to program instructions, and the programs may be stored in a computer-readable storage medium. When the programs are executed, steps of the method embodiments may be executed. The storage medium may include various media for storing programming codes, such as read-only memory (ROM), random access memory (RAM), a magnetic disc, or an optical disc.

Further, in the aforementioned device embodiments, the functional modules including the sending module, the switching module, and the processing module, may refer to one or more computer programs stored in the computer-readable storage medium. When executed by one or more processors, the corresponding computer programs implement the sending, switching, and processing functions as described in relation to FIGS. 4 and 5.

Finally it should be illustrated that, those embodiments above are only used to illustrate technical solutions of the present disclosure, but not to limit the scope of the disclosure. Though, referring to previous embodiments, the present disclosure is illustrated in details, those ordinarily skilled in the art may still understand that the disclosed technical solutions may be modified, or either partial or entire technical characteristics may be equally exchanged. Via such modification or exchange, the nature of the corresponding technical solutions will not depart from the principles of the present disclosure.

What is claimed is:

1. A controlling method for Wi-Fi dual modes, the dual modes including a station (STA) mode and an access point (AP) mode, the method comprising:
   when a Wi-Fi chip in the STA mode needs to switch from a first signal channel to a second signal channel, sending, by the Wi-Fi chip in the AP mode, a control message to an external device, wherein the control message indicating that the Wi-Fi chip is in an absent status within a preset period of time, thus enabling the external device to stop transmitting data to the Wi-Fi chip within the preset period of time based on the control message;

within the preset period of time, switching the Wi-Fi chip in the STA mode and the AP mode to work in the second signal channel; and
when the preset period of time ends, switching the Wi-Fi chip back to work in the first signal channel,
wherein:
the control message includes a notice of absence (NoA) protocol field;
the NoA protocol field is configured for notifying that the Wi-Fi chip is in an absent status within the preset period of time; and
sending the control message to the external device comprises: sending a beacon frame and a probe response frame to the external device, both the beacon frame and the probe response frame are added with the NoA protocol field.

2. The method according to claim 1, wherein:
the NoA protocol field includes a start time field ("Start Time field"), an absent duration field ("Duration field"), a field of an interval between two consecutive absent durations ("Interval field"), and a field of a count of absent durations ("Count field");
the Start Time field is configured to indicate a moment that the Wi-Fi chip starts to be in the absent status;
the Duration field is configured to indicate a duration that the Wi-Fi chip stays in the absent status;
the Interval field is configured to indicate the interval between two consecutive absent durations; and
the Count field is configured to indicate a total number of absent durations included in an absent period.

3. The method according to claim 1, wherein:
before the Wi-Fi chip in the AP mode sends the control message to the external device, the method further comprises:
adding, by the Wi-Fi chip, the NoA protocol field to the control message.

4. The method according to claim 1, wherein:
after the Wi-Fi chip in the STA mode and the AP mode switches to work in the first signal channel, the method further includes:
stopping adding the NoA protocol field to the beacon frame and the probe response frame.

5. A Wi-Fi chip, comprising:
a sending module; and
a switching module connected to the sending module,
wherein the Wi-Fi chip is configured to work in a station (STA) mode and an access point (AP) mode,
the sending module is configured to, when the Wi-Fi chip in the STA mode needs to be switched from a first signal channel to a second signal channel, send a control message to an external device in the AP mode, wherein the control message indicating that the Wi-Fi chip is in an absent status within a preset period of time, thus enabling the external device to stop transmitting data to the Wi-Fi chip within the preset period of time based on the control message; and
the switching module is configured to switch the Wi-Fi chip to work in the second signal channel within the preset period of time and further to switch the Wi-Fi chip back to work in the first signal channel when the preset period of time ends,
wherein:
the control message includes a notice of absence (NoA) protocol field;
the NoA protocol field is configured for notifying that the Wi-Fi chip is in an absent status within the preset period of time; and
the sending module is further configured to: when the Wi-Fi chip in the STA mode needs to be switched from the first signal channel to the second signal channel, send a beacon frame and a probe response frame to the external device, both the beacon frame and the probe response frame are added with the NoA protocol field.

6. The Wi-Fi chip according to claim 5, wherein:
the NoA protocol field includes a start time field ("Start Time field"), an absent duration field ("Duration field"), a field of an interval between two consecutive absent durations ("Interval field"), and a field of a count of absent durations ("Count field");
the Start Time field is configured to indicate a moment that the Wi-Fi chip starts to be in an absent status;
the Duration field is configured to indicate a duration that the Wi-Fi chip stays in the absent status;
the Interval field is configured to indicate the interval between two consecutive absent durations; and
the Count field is configured to indicate a total number of absent durations included in an absent period.

7. The Wi-Fi chip according to claim 5, further comprising:
a processing module connected to the sending module,
wherein the processing module is configured to add the NoA protocol field to the control message before the sending module sends the control message to the external device in the AP mode.

8. The Wi-Fi chip according to claim 5, wherein:
the processing module is further connected to the switching module, and
the processing module is further configured to stop adding the NoA protocol field to the beacon frame and the probe response frame after the switching module of the Wi-Fi chip in the STA mode and the AP mode switches to work in the first signal channel.

9. A communication device, comprising:
a Wi-Fi chip,
wherein the Wi-Fi chip includes:
a sending module; and
a switching module connected to the sending module,
wherein the Wi-Fi chip is configured to work in a station (STA) mode and an access point (AP) mode,
the sending module is configured to, when the Wi-Fi chip in the STA mode needs to be switched from a first signal channel to a second signal channel, send a control message to an external device in the AP mode, wherein the control message indicating that the Wi-Fi chip is in an absent status within a preset period of time, thus enabling the external device to stop transmitting data to the Wi-Fi chip within the preset period of time based on the control message; and
the switching module is configured to switch the Wi-Fi chip to work in the second signal channel within the preset period of time and further to switch the Wi-Fi chip back to work in the first signal channel when the preset period of time ends,
wherein:
the control message includes a notice of absence (NoA) protocol field;
the NoA protocol field is configured for notifying that the Wi-Fi chip is in an absent status within the preset period of time; and
the sending module is further configured to: when the Wi-Fi chip in the STA mode needs to be switched from the first signal channel to the second signal channel, send a beacon frame and a probe response frame to the external device, both the beacon frame and the probe response frame are added with the NoA protocol field.

10. The communication device according to claim 9, wherein:
- the NoA protocol field includes a start time field ("Start Time field"), an absent duration field ("Duration field"), a field of an interval between two consecutive absent durations ("Interval field"), and a field of a count of absent durations ("Count field");
- the Start Time field is configured to indicate a moment that the Wi-Fi chip starts to be in the absent status;
- the Duration field is configured to indicate a duration that the Wi-Fi chip stays in the absent status;
- the Interval field is configured to indicate the interval between two consecutive absent durations; and
- the Count field is configured to indicate a total number of absent durations included in an absent period.

11. The communication device according to claim 9, wherein:
- the Wi-Fi chip further includes a processing module connected to the sending module, and
- the processing module is configured to add the NoA protocol field to the control message before the sending module sends the control message to the external device in the AP mode.

12. The communication device according to claim 9, wherein:
- the processing module is further connected to the switching module, and
- the processing module is further configured to stop adding the NoA protocol field to the beacon frame and the probe response frame after the switching module of the Wi-Fi chip in the STA mode and the AP mode switches to work in the first signal channel.

* * * * *